(12) United States Patent
Chuang et al.

(10) Patent No.: US 11,656,604 B1
(45) Date of Patent: May 23, 2023

(54) CUTTING SPEED PLANNING SYSTEM AND METHOD AND NON-TRANSITORY STORAGE MEDIUM

(71) Applicant: ADLINK TECHNOLOGY INC., Taoyuan (TW)

(72) Inventors: Wei-Li Chuang, Taoyuan (TW); Wei-Fan Chen, Taoyuan (TW); Yu-Yen Chen, Taoyuan (TW)

(73) Assignee: ADLINK TECHNOLOGY INC., Taoyuan (TW)

( * ) Notice: Subject to any disclaimer, the term of this patent is extended or adjusted under 35 U.S.C. 154(b) by 0 days.

(21) Appl. No.: 17/715,979

(22) Filed: Apr. 8, 2022

(30) Foreign Application Priority Data

Jan. 10, 2022 (TW) .................................. 111100944

(51) Int. Cl.
*G05B 19/416* (2006.01)
*G05B 19/18* (2006.01)
(52) U.S. Cl.
CPC ....... *G05B 19/4163* (2013.01); *G05B 19/182* (2013.01); *G05B 2219/35097* (2013.01); *G05B 2219/35221* (2013.01); *G05B 2219/37518* (2013.01)

(58) Field of Classification Search
None
See application file for complete search history.

(56) References Cited

U.S. PATENT DOCUMENTS

2014/0005804 A1* 1/2014 Brand .................... G05B 19/31
700/63

* cited by examiner

*Primary Examiner* — Ryan A Jarrett

(57) ABSTRACT

Provided is a cutting speed planning system including a graphic preprocessing engine, a first speed planning engine, an included angle calculation engine, a second speed planning engine and a speed determination engine. The graphic preprocessing engine substitutes a simplified cutting route for a plurality of short straight paths of a graphic path. The first speed planning engine calculates a reasonable maximum cutting speed of each cutting route. The included angle calculation engine calculates the included angle between two adjacent ones of the cutting routes. The second speed planning engine adjusts the terminal cutting speed and the initial cutting speed of the cutting routes. The speed determination engine performs speed planning on the cutting routes according to digital control system period time. A cutting speed planning method and a non-transitory storage medium are further provided.

12 Claims, 8 Drawing Sheets

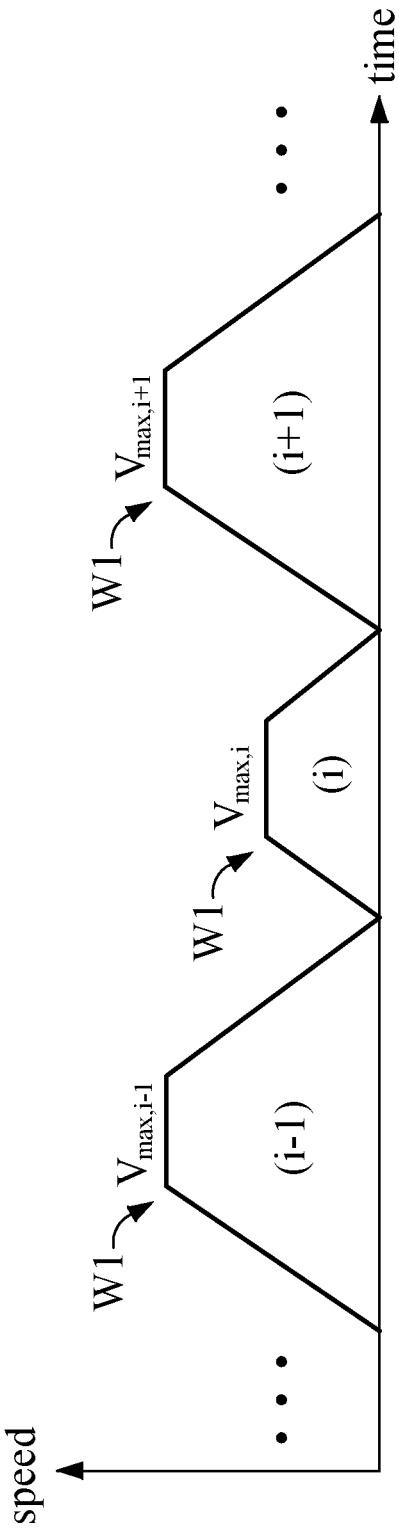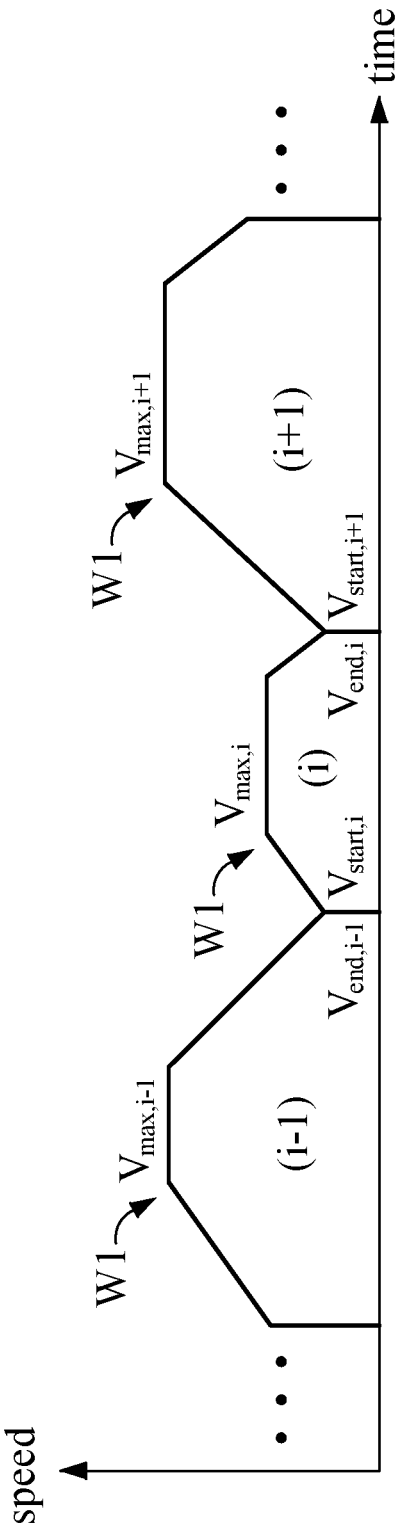
FIG. 6
FIG. 7

CUTTING SPEED PLANNING SYSTEM AND METHOD AND NON-TRANSITORY STORAGE MEDIUM

This non-provisional application claims priority under 35 U.S.C. § 119(a) on Patent Application No(s). 111100944 filed in Taiwan, R.O.C. on Jan. 10, 2022, the entire contents of which are hereby incorporated by reference.

BACKGROUND OF THE INVENTION

1. Field of the Invention

The present disclosure relates to cutting speed planning technology applicable to two-dimensional surface cutting, and in particular to a cutting speed planning system and method and non-transitory storage medium for use in planning the processing speed for graphic paths each having a plurality of cutting routes.

2. Description of the Related Art

The speed and quality of workpiece processing has increasingly strict requirements to meet the demand for industrial upgrading and development of high technology. For instance, the industrial sector has to finish processing plastic films which match smartphones in size with laser cutting machines, only within 10 seconds and with acceptable processing deviations—microscale processing deviations.

To carry out the aforesaid processing task, a movement controller performs speed planning according to cutting route conditions and restriction criteria.

The cutting routes often bend; thus, processing precision will deteriorate unless the planning of cutting speed takes into account of the bends of the cutting routes. Dividing each cutting route into a plurality of route sections according to the number of bends and coming to a complete standstill at each bend can ensure processing precision but reduces the overall processing speed greatly.

BRIEF SUMMARY OF THE INVENTION

An objective of the present disclosure is to provide a cutting speed planning system and method and a non-transitory storage medium with a view to attaining required processing precision and required processing speed.

To achieve at least the above objective, the first aspect of the present disclosure provides a cutting speed planning system adapted to plan a processing speed of a graphic path having a plurality of cutting routes. The cutting speed planning system comprises a graphic preprocessing engine, a first speed planning engine, an included angle calculation engine, a second speed planning engine and a speed determination engine. The graphic preprocessing engine is adapted to compare an actual cutting route corresponding to a plurality of short straight paths with a simplified cutting route defined by a straight line between any two endpoints of the short straight paths, wherein the simplified cutting route substitutes for the actual cutting route within a range defined by the two endpoints when an deviation between the simplified cutting route and the actual cutting route is less than a predetermined deviation threshold. The first speed planning engine is adapted to calculate a reasonable maximum cutting speed of each cutting route according to the length of the cutting route and an estimated maximum cutting speed corresponding to the graphic path. The included angle calculation engine is adapted to calculate the included angle between two adjacent ones of the cutting routes. The second speed planning engine is adapted to make the terminal cutting speed of each cutting route equal to the initial cutting speed of the next cutting route. The speed determination engine is adapted to change each stage time of each cutting route into an integer multiple of a digital control system period time and adjust respective speed planning of the cutting routes.

To achieve at least the above objective, the second aspect of the present disclosure provides a cutting speed planning method adapted to plan a processing speed of a graphic path having a plurality of cutting routes, the cutting speed planning method comprising the steps of: comparing, with a graphic preprocessing engine, an actual cutting route corresponding to a plurality of short straight paths with a simplified cutting route connected by a straight line between any two endpoints of the uniform short straight paths, wherein the simplified cutting route substitutes for an actual cutting route within a range defined by the two endpoints when an deviation between the simplified cutting route and the actual cutting route is less than a predetermined deviation threshold; calculating, with a first speed planning engine, a reasonable maximum cutting speed of each cutting route according to the length of the cutting routes and an estimated maximum cutting speed corresponding to the graphic path; calculating, with an included angle calculation engine, the included angle between two adjacent ones of the cutting routes; making, with a second speed planning engine, a terminal cutting speed of each cutting route equal to an initial cutting speed of the next cutting route; and changing each stage time of each cutting route to an integer multiple of a digital control system period time and adjusting respective speed planning of the cutting routes, with a speed determination engine.

To achieve at least the above objective, the third aspect of the present disclosure provides a non-transitory storage medium adapted to store a plurality of program instructions executable when read by an electronic device to carry out the steps of the second aspect and thus plan the processing speed of a graphic path having a plurality of cutting routes.

In an embodiment, the included angle calculation engine is adapted to calculate the included angle between two adjacent ones of the cutting routes. The cutting routes include straight routes and arcuate routes. The included angle calculation engine is adapted to calculate included angles between the straight cutting routes, included angles between the arcuate cutting routes, and included angles between the straight and arcuate cutting routes.

In an embodiment, the graphic preprocessing engine creates a linear planning model in a two-dimensional space by method of least square to calculate a total deviation of folding lines defined by a plurality of endpoints within the range defined by a straight line between any two endpoints of the short straight paths. When the total deviation is less than a maximum value of the predetermined deviation threshold, the simplified cutting route corresponding to the straight line substitutes for the actual cutting route corresponding to the folding lines.

In an embodiment, if the length of each cutting route, as calculated by the first speed planning engine, is sufficient for carrying out a uniform-speed cutting process at the estimated maximum cutting speed, the reasonable maximum cutting speed will be set to the estimated maximum cutting speed, otherwise the estimated maximum cutting speed will be adjusted to the reasonable maximum cutting speed according to the total acceleration stage time, acceleration increment stage time, uniform acceleration stage time, estimated maximum cutting speed, initial cutting speed, maximum acceleration, uniform speed stage time, maximum deceleration, total deceleration stage time, deceleration increment stage time, deceleration decrement stage time and S-shaped speed curve adjustment parameter, which the cutting route corresponds to.

In an embodiment, the total acceleration stage time is denoted by $T_a$, acceleration increment stage time by $T_1$, uniform acceleration stage time by $T_2$, acceleration decrement stage time by $T_3$, estimated maximum cutting speed by $V_{max}$, initial cutting speed by $V_{start}$, terminal cutting speed by $V_{end}$, maximum acceleration by $Acc_{max}$, uniform speed stage time by $T_4$, length of cutting routes by L, maximum deceleration by $Dec_{max}$, total deceleration stage time by $T_d$, deceleration increment stage time by $T_5$, uniform deceleration stage time by $T_6$, deceleration decrement stage time by $T_7$, S-shaped speed curve adjustment parameter by $S_{factor}$, and reasonable maximum cutting speed by $V'_{max}$ which each cutting route corresponds to, wherein $$T_a = (V_{max} - V_{start})/Acc_{max},\ T_1 = T_3 = s_{factor} T_a,\ T_2 = T_a - T_1$$

$$T_d = (V_{max} - V_{end})/Dec_{max},\ T_5 = T_7 = s_{factor} T_d,\ T_6 = T_d - T_5$$

$$T_4 = \left[L - T_u\left(V_{start} + \frac{1}{2}Acc_{max}T_a\right) - T_l\left(V_{max} + \frac{1}{2}Dec_{max}T_d\right)\right]/V_{max},$$

where $T_u = 2T_1 + T_2$ and $T_l = 2T_5 + T_6$,

That $T_4$ is greater than 0 indicates that the length of the cutting route is sufficient, and thus the reasonable maximum cutting speed $V'_{max} = V_{max}$. When $T_4$ is less than or equal to 0, the reasonable maximum cutting speed is expressed by the equation below.

$$V'_{max} = \sqrt{\left[\frac{V_{end}^2}{Dec_{max}} - \frac{V_{start}^2}{Acc_{max}} - \left(\frac{2L}{1+s_{factor}}\right)\right]/\left(\frac{1}{Dec_{max}} - \frac{1}{Acc_{max}}\right)}$$

In an embodiment, the speed determination engine is adapted to adjust the acceleration increment stage time, uniform acceleration stage time, uniform speed stage time, deceleration decrement stage time, and uniform deceleration stage time for each cutting route into an integer multiple of the digital control system period time.

In an embodiment, the second speed planning engine is adapted to calculate a turning angle restriction speed between each cutting route and the next cutting route and set a terminal cutting speed of each cutting route and an initial cutting speed of its next cutting route to a least one of the turning angle restriction speed, the reasonable maximum cutting speed corresponding to each cutting route, and the reasonable maximum cutting speed corresponding to the next cutting route.

In an embodiment, the turning angle restriction speed is denoted by $V_{limit}$, the maximum acceleration corresponding to each cutting route by $Acc_{max}$, the included angle between each cutting route and its next cutting route by β, and the digital control system period time by $T_s$, wherein $V_{limit} = Acc_{max} T_s / 2\sin(\beta/2)$ In an embodiment, upon completion of the adjustment of each stage time of each cutting route in accordance with the digital period adjustment time, the second speed planning engine further checks and determines whether a terminal cutting speed of the cutting route is equal to an initial cutting speed of its next cutting route, wherein, given a negative determination, the second speed planning engine makes the terminal cutting speed of the cutting route equal to the initial cutting speed of its next cutting route again, and the speed determination engine performs speed planning on the cutting route again and then checks whether the initial cutting speed of the cutting route is equal to the terminal cutting speed of its preceding cutting route.

Therefore, according to the present disclosure, the cutting speed planning system and method and the non-transitory storage medium automatically calculate the reasonable maximum cutting speed of each cutting route, calculate a turning angle between the cutting routes, and coordinate the initial cutting speed and the terminal cutting speed between the cutting routes, thereby attaining the required processing precision and the required processing speed.

BRIEF DESCRIPTION OF THE DRAWINGS

FIG. 6 is a schematic view of how a cutting speed planning system plans a reasonable maximum cutting speed of each cutting route according to an embodiment of the present disclosure.

FIG. 7 is a schematic view of how the cutting speed planning system adjusts a reasonable initial cutting speed and a reasonable terminal cutting speed of each cutting route according to an embodiment of the present disclosure.

DETAILED DESCRIPTION OF THE INVENTION

To facilitate understanding of the object, characteristics and effects of this present disclosure, embodiments together with the attached drawings for the detailed description of the present disclosure are provided.

Figure 1:
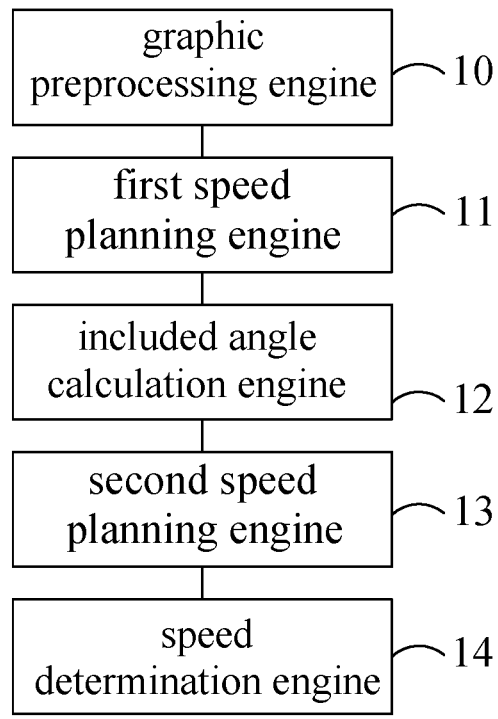
FIG. 1 is a block diagram of a cutting speed planning system according to an embodiment of the present disclosure.
Figure 2:
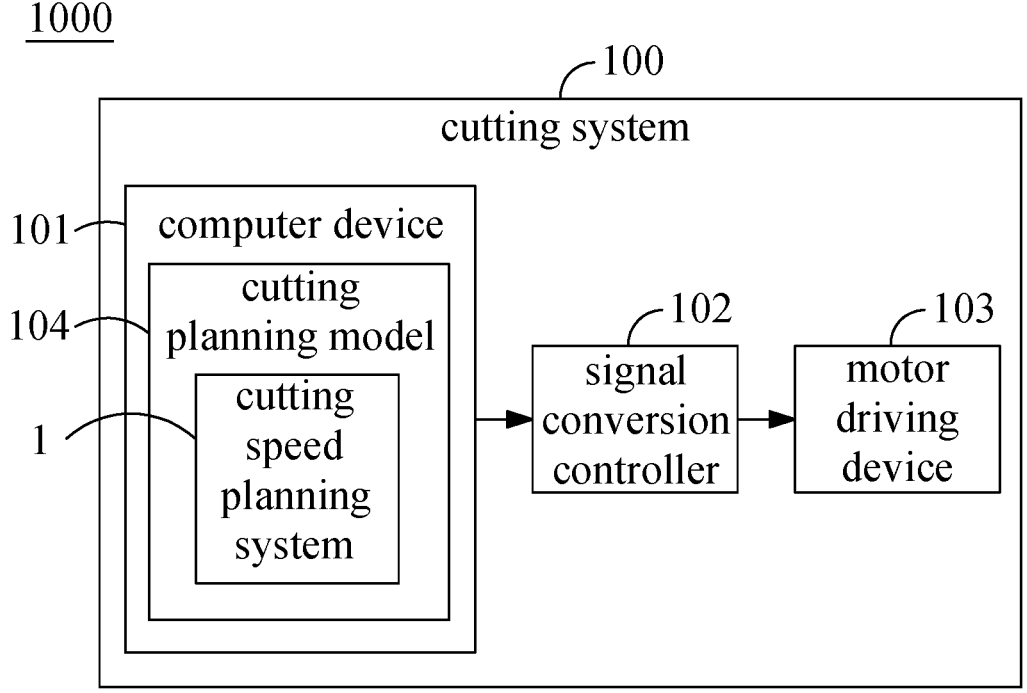
FIG. 2 is a block diagram of a cutting system according to an embodiment of the present disclosure.
Figure 3:
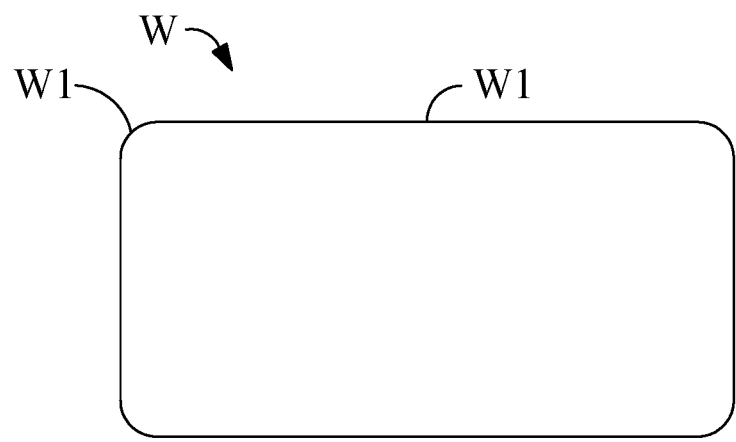
FIG. 3 is a schematic view of a graphic path.

Referring to FIG. 1 through FIG. 3, FIG. 2 shows a cutting system 100 disposed in a laser cutting apparatus 1000 to cut a plastic (not shown) according to a graphic path W shown in FIG. 3 and thereby obtain a target object (not shown). A user inputs the graphic path W, a deviation threshold and a plurality of movement restriction criteria into the laser cutting apparatus 1000. The movement restriction criteria include an estimated maximum cutting speed, a maximum acceleration, an S-shaped speed curve adjustment parameter and a digital control system period time. The graphic path W comprises a straight line and arcuate cutting route W1. The user not only inputs the starting point and the ending point of the straight line but also inputs the starting point, center and angle of the arcuate cutting route W1.

As shown in FIG. 1, the first aspect of the present disclosure provides a cutting speed planning system 1 adapted to plan the processing speed of the graphic path W. The graphic path W has a plurality of cutting route W1. The cutting speed planning system 1 comprises a graphic preprocessing engine 10, a first speed planning engine 11, an included angle calculation engine 12, a second speed planning engine 13 and a speed determination engine 14.

Figure 4:
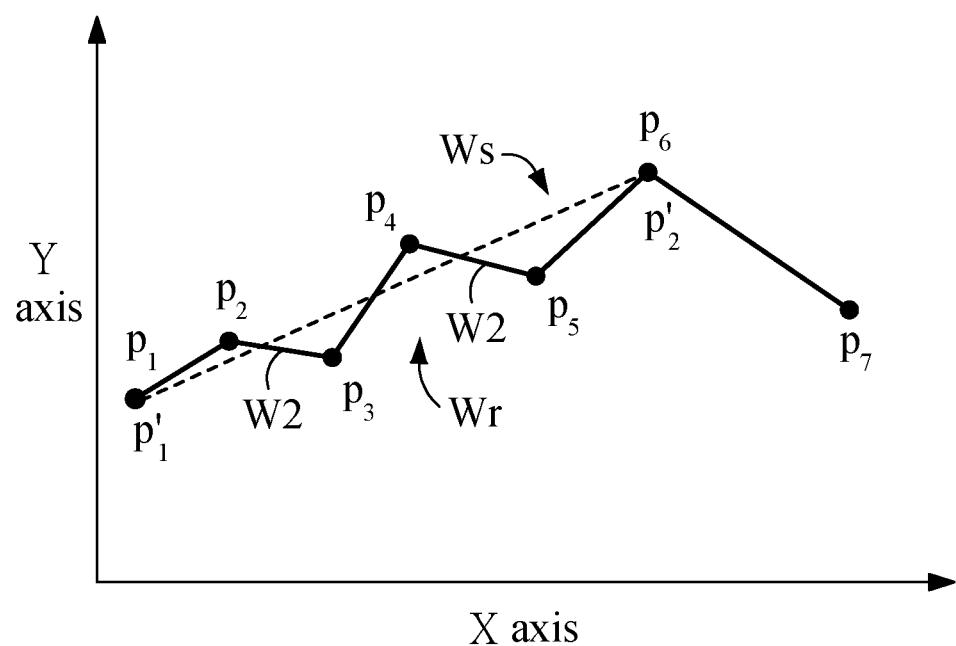
FIG. 4 is a schematic view of a plurality of short straight paths in the graphic path on two-dimensional Cartesian coordinates.

As shown in FIG. 3 and FIG. 4, the graphic preprocessing engine 10 is adapted to compare an actual cutting route Wr corresponding to a plurality of short straight paths W2 of the cutting routes W1 with a simplified cutting route Ws defined by a straight line between any two endpoints of the short straight paths W2. When the deviation between the simplified cutting route Ws and the actual cutting route Wr is less than a predetermined deviation threshold, the simplified cutting route Ws substitutes for the actual cutting route Wr within the range defined by the two endpoints.

As shown in FIG. 1, FIG. 6 and FIG. 7, the first speed planning engine 11 of FIG. 6 is adapted to calculate a reasonable maximum cutting speed of each cutting route W1, for example, (i−1)th reasonable maximum cutting speed $V_{max,i-1}$ ith reasonable maximum cutting speed $V_{max,1}$ and (i+1)th reasonable maximum cutting speed $V_{max,i+1}$ according to the corresponding graphic path W, that is, the length of the cutting routes W1 and the estimated maximum cutting speed inputted in advance by the user. Then, the included angle calculation engine 12 is adapted to calculate the included angle between two adjacent ones of the cutting routes W1. Next, the second speed planning engine 13 is adapted to make the terminal cutting speed of each cutting routes W1 equal to the initial cutting speed of the next cutting route W1 according to the included angle between the cutting routes W1 and the maximum cutting speed for each cutting route W1. For instance, as shown in FIG. 7, the ith initial cutting speed $V_{start,i}$ of the cutting route W1 with the ith reasonable maximum cutting speed $V_{max}$ is equal to the (i−1)th terminal cutting speed $V_{end,i-1}$ of the preceding cutting route W1, whereas the ith terminal cutting speed $V_{end,i}$ is equal to the (i+1)th initial cutting speed $V_{start,i+1}$ of the next cutting route W1. The initial cutting speed and the terminal cutting speed of all the cutting routes W1 are not zero, but the initial cutting speed of the starting cutting route W1 and the terminal cutting speed of the ending cutting route W1 are zero.

As shown in FIG. 1 and FIG. 3, the speed determination engine 14 is adapted to change each stage time of each cutting route W1 to an integer multiple of the digital control system period time and adjust the respective speed planning of the cutting routes W1.

Figure 5:
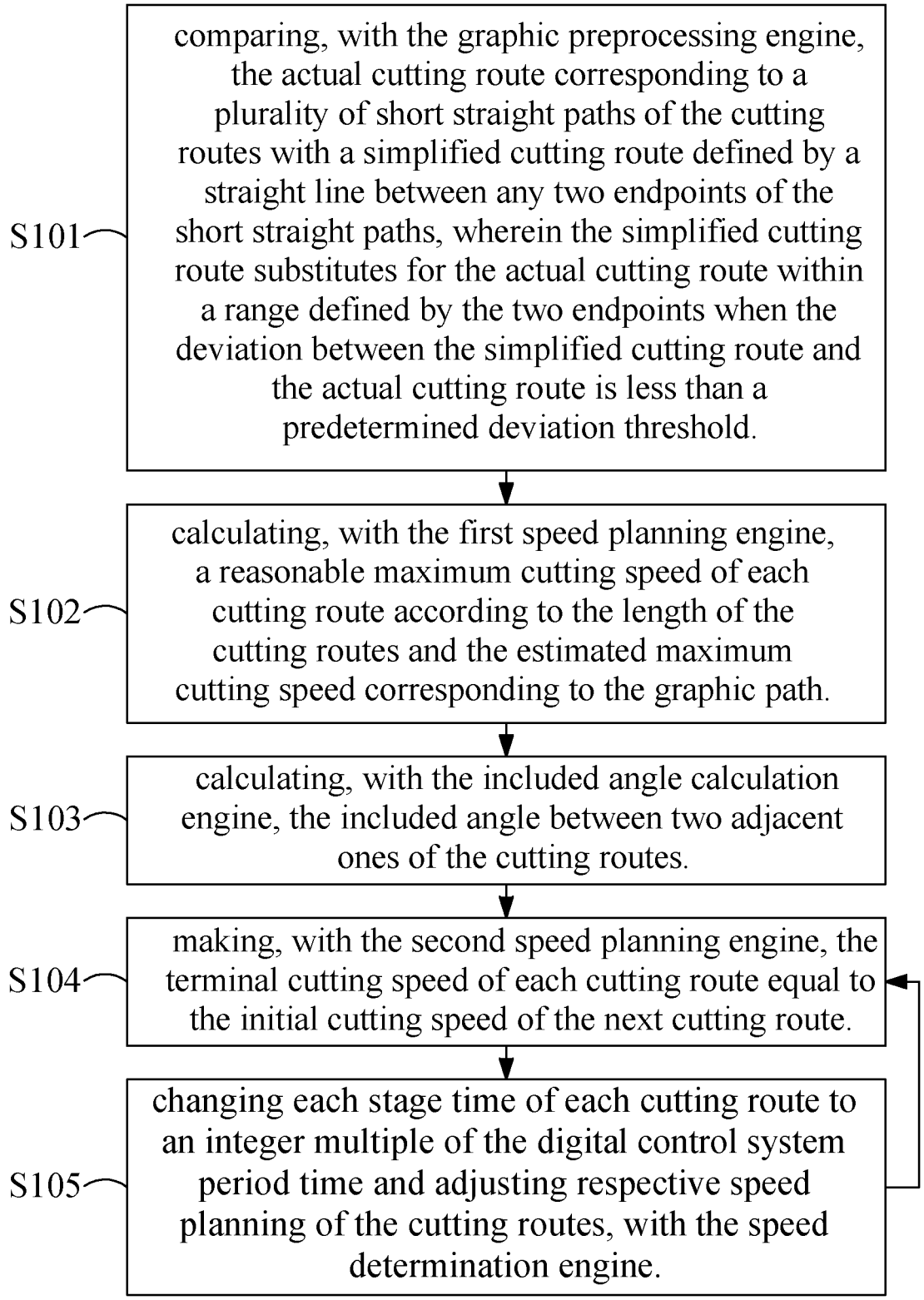
FIG. 5 is a schematic view of a process flow of a cutting speed planning method according to an embodiment of the present disclosure.

As shown in FIG. 5 (with reference to FIG. 1, FIG. 3 and FIG. 4), the second aspect of the present disclosure provides a cutting speed planning method adapted to plan the processing speed of the graphic path W. The cutting speed planning method comprises the steps described below.

Step S101: comparing, with the graphic preprocessing engine 10, the actual cutting route Wr corresponding to a plurality of short straight paths W2 of the cutting routes W1 with a simplified cutting route defined by a straight line between any two endpoints of the short straight paths W2, wherein the simplified cutting route Ws substitutes for the actual cutting route Wr within a range defined by the two endpoints when the deviation between the simplified cutting route Ws and the actual cutting route Wr is less than a predetermined deviation threshold.

Step S102: calculating, with the first speed planning engine 11, a reasonable maximum cutting speed of each cutting route according to the length of the cutting routes and the estimated maximum cutting speed corresponding to the graphic path W.

Step S103: calculating, with the included angle calculation engine 12, the included angle between two adjacent ones of the cutting routes W1.

Step S104: making, with the second speed planning engine 13, the terminal cutting speed of each cutting route W1 equal to the initial cutting speed of the next cutting route W1.

Step S105: changing each stage time of each cutting route to an integer multiple of the digital control system period time and adjusting respective speed planning of the cutting routes W1, with the speed determination engine 14.

The third aspect of the present disclosure provides a non-transitory storage medium which stores a plurality of program instructions executable when read by an electronic device to carry out the steps in the second aspect and thus plan the processing speed of a graphic path W having a plurality of cutting routes W1.

As shown in FIG. 1 through FIG. 3, the fourth aspect of the present disclosure provides the cutting system 100 for use in cutting a plastic according to the graphic path W. The cutting system 100 comprises a computer device 101, a signal conversion controller 102 and a motor driving device 103. The computer device 101 comprises a cutting planning model 104. The cutting planning model 104 has the cutting speed planning system 1 of the first aspect. The signal conversion controller 102 is electrically connected to the computer device 101 to receive a motor pulse command from the computer device 101 and convert the motor pulse command into a control command. The motor driving device 103 is electrically connected to the signal conversion controller 102 to receive the control command and control a servomotor (not shown) with the control command, thereby driving a laser cutting head (not shown) to move and perform cutting.

Therefore, according to the present disclosure, the cutting speed planning system 1 and method, non-transitory storage medium and cutting system automatically calculate a reasonable maximum cutting speed of each cutting route W1, calculate the turning angle between the cutting routes W1, and coordinate the initial cutting speed and the terminal cutting speed between the cutting routes W1, so as to optimize both the processing precision and the processing speed.

As shown in FIG. 4 and FIG. 5, in an embodiment, the graphic preprocessing engine 10 creates a linear planning model in a two-dimensional space by the method of least square to calculate the total deviation of the folding lines defined by a plurality of endpoints within the range defined by a straight line between any two endpoints of the short straight paths W2. When the total deviation is less than a maximum value of the predetermined deviation threshold, the simplified cutting route Ws corresponding to the straight line substitutes for the actual cutting route Wr corresponding to the folding lines. For instance, in FIG. 4, first endpoints p1, second endpoints p2, third endpoints p3, fourth endpoints p4, fifth endpoints p5, sixth endpoints p6 and seventh endpoints p7 together define a plurality of short straight paths W2. The proportion of the folding-line-shaped actual cutting route Wr formed by the short straight paths W2 to the graphic path W is small. Carrying out a cutting process according to the actual cutting route Wr not only increases the overall processing time but does not contribute significantly to the precision of a target object produced by the cutting process. In FIG. 4, the straight line between any two endpoints is expressed by the equation Y=mX+c, here m denotes first model coefficient, and c denotes second model coefficient, wherein $$m = \frac{\sum_{i=1}^{n}(x_i - \bar{x})(y_i - \bar{y})}{\sum_{i=1}^{n}(x_i - \bar{x})^2}$$

$$c = \bar{y} - m\bar{x}, \quad n = 7$$

total deviation threshold is calculated with the equation below, $$L(x) = \sum_{i=1}^{n}(y_i - p_i)^2, \quad n = 7$$

In FIG. 4, after being calculated with the above equation, the straight line joining the first endpoints p1 to sixth endpoints p6 substitutes for the folding line from p1 to p6. However, the straight line joining the first endpoints p1 to seventh endpoints p7 exceeds the deviation threshold. Thus, the actual cutting route Wr comprising a plurality of short straight paths W2 of the original first endpoints p1 through sixth endpoints p6 can be replaced with the simplified cutting route Ws corresponding to a new first endpoints p1' through a new second endpoints p2'.

As shown in FIG. 1 and FIG. 8 through FIG. 14, in an embodiment, if the length of each cutting route W1, as calculated by the first speed planning engine 11, is sufficient for carrying out a uniform-speed cutting process at the estimated maximum cutting speed, the reasonable maximum cutting speed will be set to the estimated maximum cutting speed, otherwise the estimated maximum cutting speed will be changed to the reasonable maximum cutting speed according to the total acceleration stage time, acceleration increment stage time, uniform acceleration stage time, acceleration decrement stage time, estimated maximum cutting speed, initial cutting speed, maximum acceleration, uniform speed stage time, maximum deceleration, total deceleration stage time, deceleration increment stage time, deceleration decrement stage time and the S-shaped speed curve adjustment parameter, which the cutting route W1 corresponds to. Owing to the S-shaped speed curve adjustment parameter, the speed curves shown in FIG. 8 through FIG. 14 are smooth to prevent the cutting process from being abruptly stopped or started and thus protect the cutting machine against damage.

Regarding each cutting route W1, the total acceleration stage time is denoted by $T_a$, acceleration increment stage time by $T_1$, uniform acceleration stage time by $T_2$, acceleration decrement stage time by $T_3$, estimated maximum cutting speed by $V_{max}$, initial cutting speed by $V_{start}$, terminal cutting speed by $V_{end}$, maximum acceleration by $Acc_{max}$, uniform speed stage time by $T_4$, cutting route length by L, maximum deceleration by $Dec_{max}$, total deceleration stage time by $T_d$, deceleration increment stage time by $T_5$, uniform deceleration stage time by $T_6$, deceleration decrement stage time by $T_7$, S-shaped speed curve adjustment parameter by S factor, and reasonable maximum cutting speed by $V'_{max}$, wherein $$T_a = (V_{max} - V_{start})/Acc_{max}, \; T_1 = T_3 = s_{factor}T_a, \; T_2 = T_a - T_1$$

$$T_d = (V_{max} - V_{end})/Dec_{max}, \; T_5 = T_7 = s_{factor}T_d, \; T_6 = T_d - T_5$$

$$T_4 = \left[L - T_u\left(V_{start} + \frac{1}{2}Acc_{max}T_a\right) - T_l\left(V_{max} + \frac{1}{2}Dec_{max}T_d\right)\right]/V_{max},$$

where $T_u = 2T_1 + T_2$ and $T_l = 2T_5 + T_6$,

When T4 is greater than 0, it indicates that the length of the cutting route is sufficient, and thus reasonable maximum cutting speed $V'_{max}=V_{max}$. When $T_4$ is less than or equal to 0, the reasonable maximum cutting speed is calculated by the equation below.

$$V'_{max} = \sqrt{\left[\frac{V_{end}^2}{Dec_{max}} - \frac{V_{start}^2}{Acc_{max}} - \left(\frac{2L}{1+s_{factor}}\right)\right]/\left(\frac{1}{Dec_{max}} - \frac{1}{Acc_{max}}\right)}$$

As shown in FIG. 1 and FIG. 3, in an embodiment, the cutting routes W1 include straight routes and arcuate routes. The included angle calculation engine is adapted to calculate included angles between the straight cutting routes W1, included angles between the arcuate cutting routes W1, and included angles between the straight and arcuate cutting routes W1.

As shown in FIG. 1, FIG. 6 and FIG. 7, the capability of the second speed planning engine 13 to carry out speed planning is illustrated with FIG. 6 and FIG. 7. The second speed planning engine 13 is adapted to calculate a turning angle restriction speed between the cutting routes W1 and set the terminal cutting speed of each cutting route and the initial cutting speed of its next cutting route to the least one of the turning angle restriction speed, the reasonable maximum cutting speed corresponding to each cutting route W1, and the reasonable maximum cutting speed corresponding to the next cutting route W1. The turning angle restriction speed is denoted by $V_{limit}$, the maximum acceleration corresponding to each cutting route W1 by $ACC_{max}$, the included angle between each cutting route W1 and its next cutting route W1 by β, and the digital control system period time by Ts. The turning angle restriction speed $V_{limit}$ is calculated with the equation below.

$$V_{limit}=Acc_{max}T_s/2sin(\beta_i/2)$$

As shown in FIG. 1 and FIG. 8 through 14, in an embodiment, the speed determination engine 14 is adapted to adjust the acceleration increment stage time T1, uniform acceleration stage time T2, uniform speed stage time T4, deceleration decrement stage time T5, and uniform deceleration stage time T6 of each cutting route W1 into an integer multiple of the digital control system period time Ts and adjust the speed planning of each cutting route W1.

Figure 8:
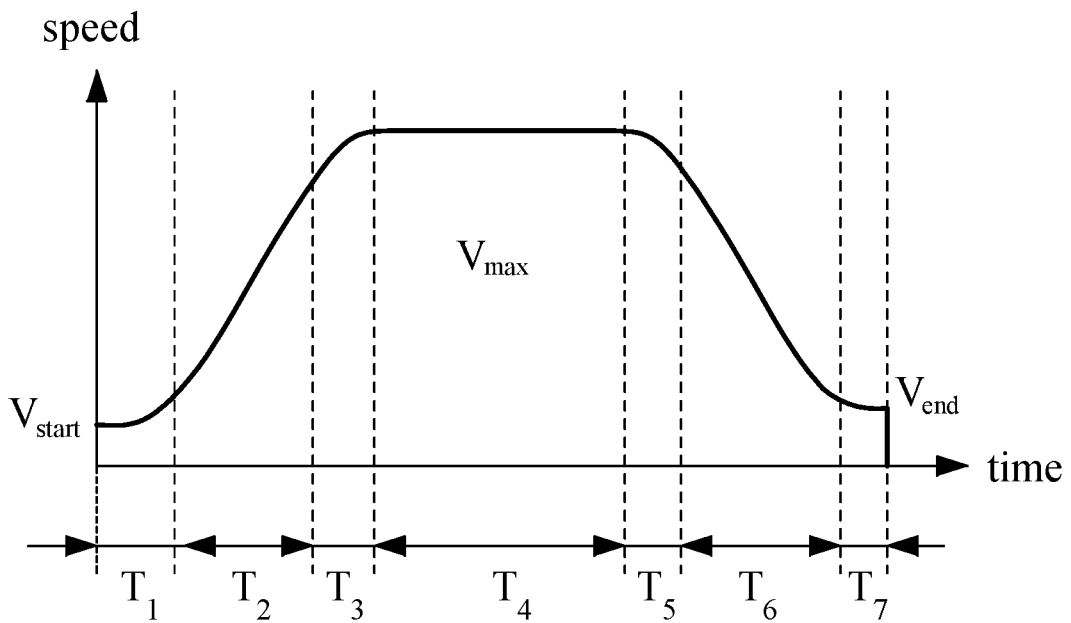
FIG. 8 is speed graph I of a cutting route of the cutting speed planning system according to an embodiment of the present disclosure.

For instance, the speed curve shown in FIG. 8 indicates that the initial cutting speed $V_{start}$ and the terminal cutting speed $V_{end}$ remain unchanged, whereas the maximum acceleration is changed to $Acc'_{max}$, the reasonable maximum cutting speed $V_{max}$ to $V'_{max}$, and the maximum deceleration to $Dec'_{max}$, wherein L denotes the length of the cutting route W1. The overall speed planning is adjusted according to the combination below.

$$\begin{cases} V'_{start} = V_{start} \\ V'_{end} = V_{end} \\ Acc'_{max} = [2L - V_{start}(2T_u + 2T_4 + T_l) - V_{end}T_l]/[T_a(T_u + 2T_4 + T_l)] \\ V'_{max} = (2L - V_{start}T_u - V_{end}T_l)/(T_u + 2T_4 + T_l) \\ Dec'_{max} = [V_{start}T_u + V_{end}(T_u + 2T_4 + 2T_l) - 2L]/[T_d(T_u + 2T_4 + T_l)] \end{cases}$$

Figure 9:
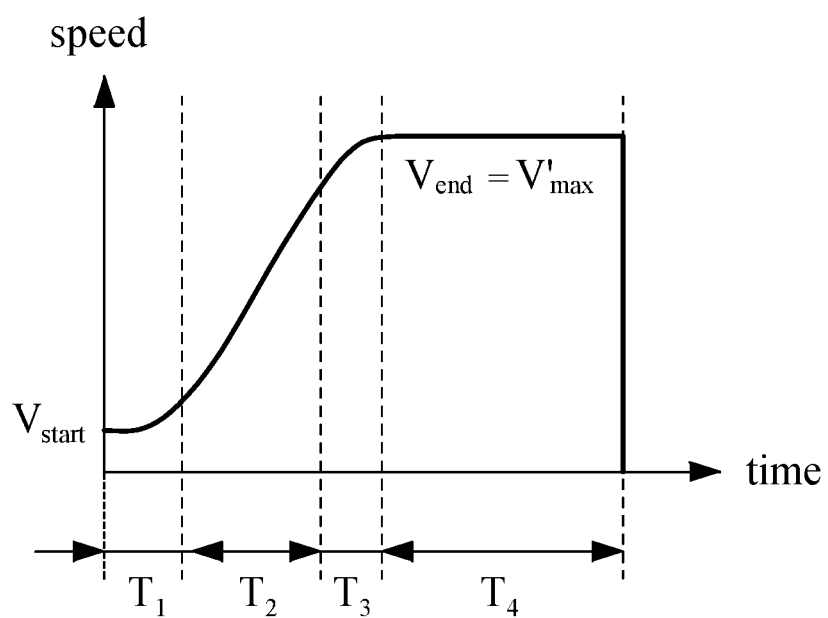
FIG. 9 is speed graph II of a cutting route of the cutting speed planning system according to an embodiment of the present disclosure.

For instance, the speed curve shown in FIG. 9 indicates that the initial cutting speed $V_{start}$ remains unchanged, but the terminal cutting speed $V_{end}$ is changed to $V'_{end}$, and $V'_{end}$ is equal to $V'_{max}$ resulting from the adjustment of reasonable maximum cutting speed $V_{max}$. The maximum acceleration is changed to $Acc'_{max}$, and the maximum deceleration $Dec'_{max}$ is changed to zero. The overall speed planning is adjusted according to the combination below.

$$\begin{cases} V'_{start} = V_{start} \\ V'_{end} = (2L - V_{start}T_u)/(T_u + 2T_4) \\ Acc'_{max} = [2L - 2V_{start}(T_u + T_4)]/[T_a(T_u + 2T_4)] \\ V'_{max} = (2L - V_{start}T_u)/(T_u + 2T_4) \\ Dec'_{max} = 0 \end{cases}$$

Figure 10:
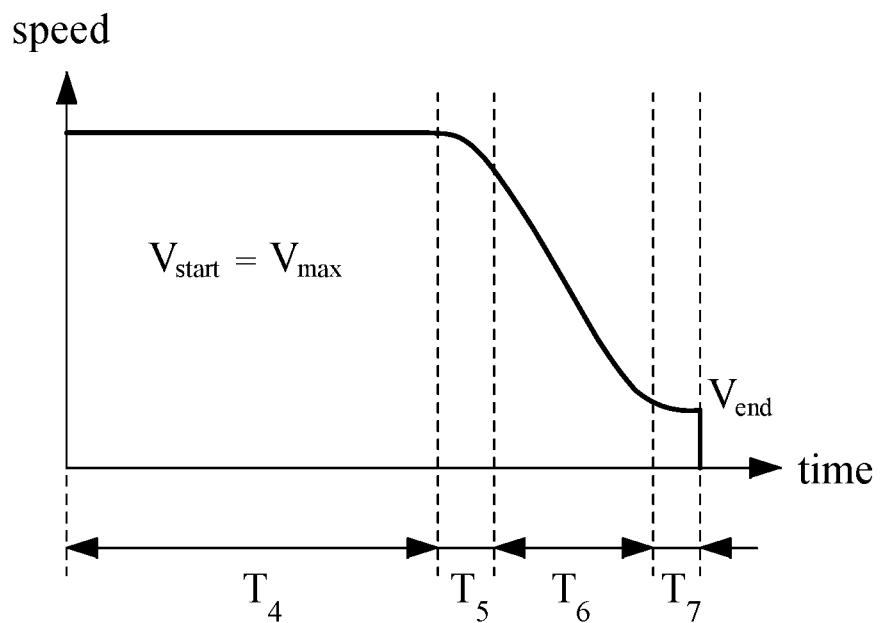
FIG. 10 is speed graph III of a cutting route of the cutting speed planning system according to an embodiment of the present disclosure.

For instance, the speed curve shown in FIG. 10 indicates that the terminal cutting speed $V_{end}$ remains unchanged, but the initial cutting speed $V_{start}$ is changed to $V'_{start}$, and $V'_{start}$ is equal to $V'_{max}$, resulting from the adjustment of reasonable maximum cutting speed $V_{max}$. The maximum acceleration $Acc'_{max}$, is changed to zero. The maximum deceleration is changed to $Dec'_{max}$. The overall speed planning is adjusted according to the combination below.

$$\begin{cases} V'_{start} = (-V_{end}T_l + 2L)/(T_l + 2T_4) \\ V'_{end} = V_{end} \\ Acc'_{max} = 0 \\ V'_{max} = (-V_{end}T_l + 2L)/(T_l + 2T_4) \\ Dec'_{max} = (2V_{end}(T_l + T_4) - 2L)/[T_d(T_l + 2T_4)] \end{cases}$$

Figure 11:
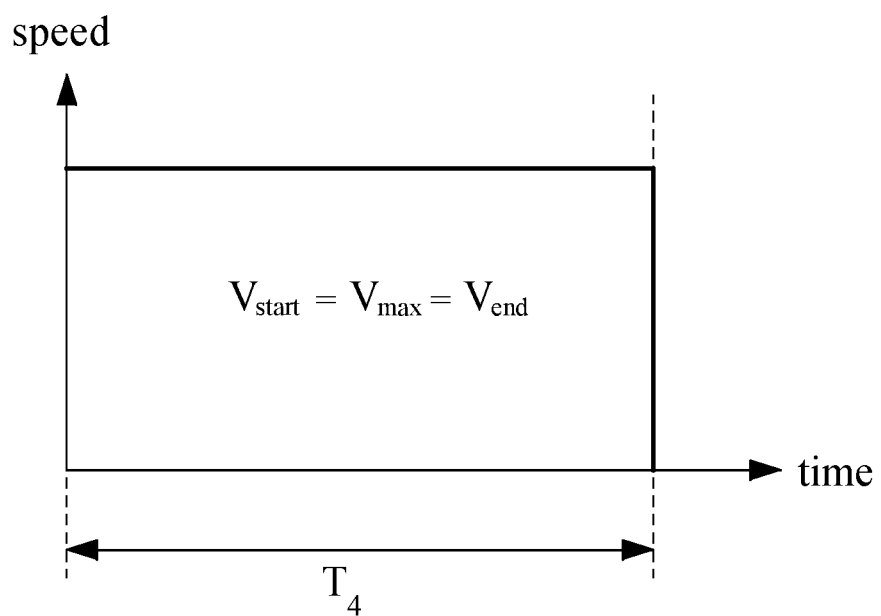
FIG. 11 is speed graph IV of a cutting route of the cutting speed planning system according to an embodiment of the present disclosure.

For instance, the speed curve shown in FIG. 11 indicates that the initial cutting speed $V_{start}$ is equal to the terminal cutting speed $V_{end}$ and reasonable maximum cutting speed $V_{max}$. After the adjustment, the initial cutting speed, terminal cutting speed and reasonable maximum cutting speed are only values relative to the length L of the cutting route W1 and the uniform speed stage time T4, wherein both the maximum acceleration $Acc'_{max}$ and the maximum deceleration $Dec'_{max}$ are zero. The overall speed planning is adjusted according to the combination below.

$$\begin{cases} V'_{start} = L/T_4 \\ V'_{end} = L/T_4 \\ Acc'_{max} = 0 \\ V'_{max} = L/T_4 \\ Dec'_{max} = 0 \end{cases}$$

Figure 12:
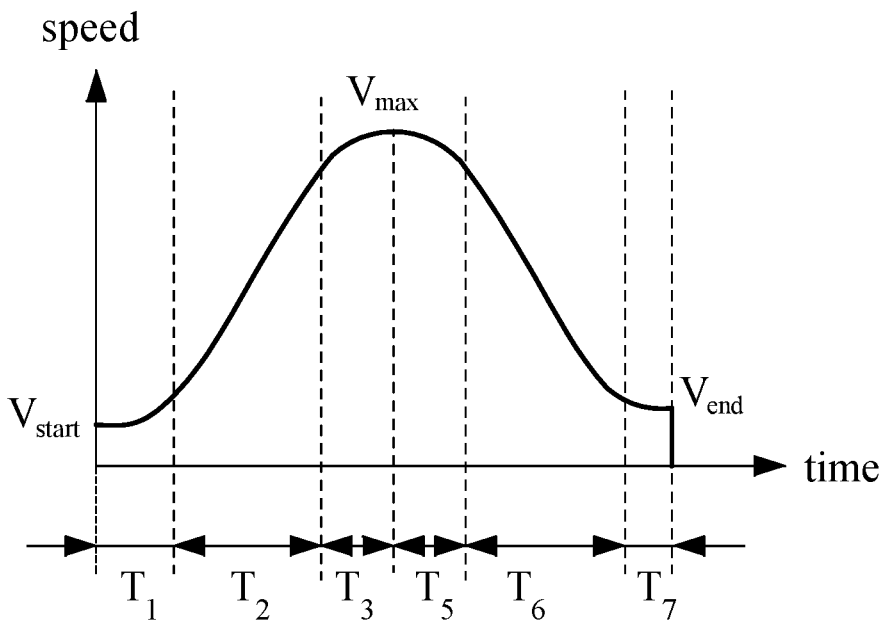
FIG. 12 is speed graph V of a cutting route of the cutting speed planning system according to an embodiment of the present disclosure.
Figure 13:
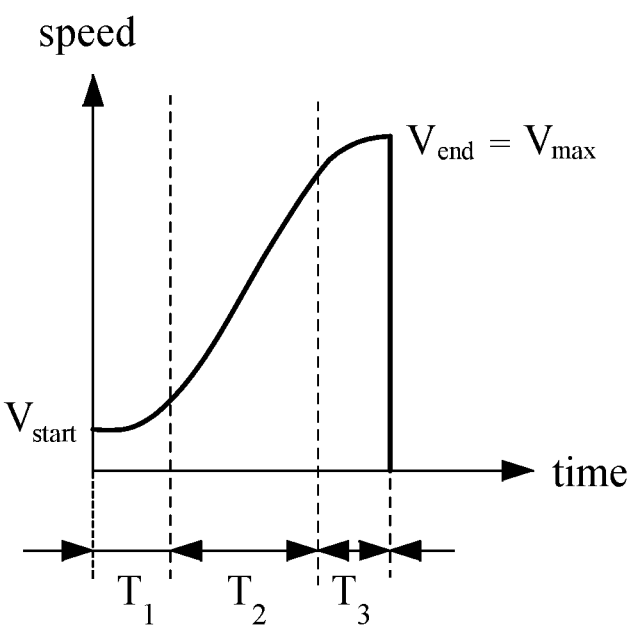
FIG. 13 is speed graph VI of a cutting route of the cutting speed planning system according to an embodiment of the present disclosure.
Figure 14:
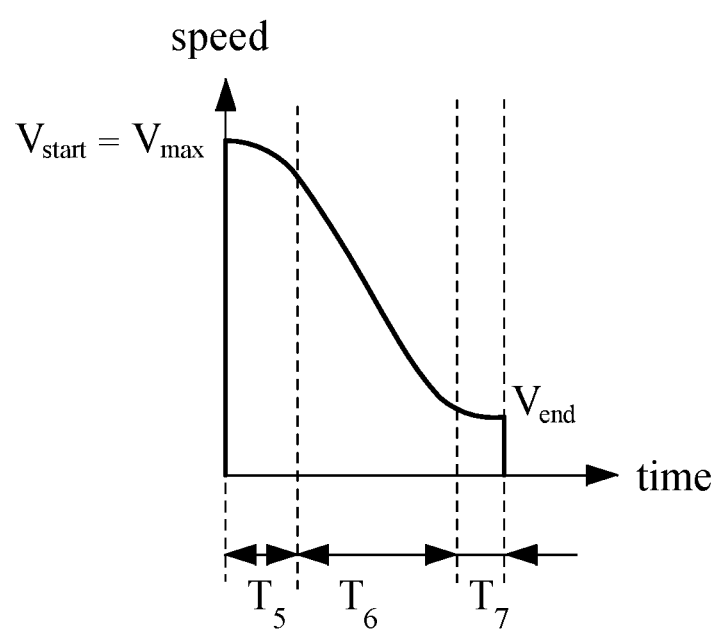
FIG. 14 is speed graph VII of a cutting route of the cutting speed planning system according to an embodiment of the present disclosure.

The speed curve shown in FIG. 12 through FIG. 14 indicates that it is impossible to attain the original maximum reasonable maximum cutting speed, and thus T4 is zero. Therefore, the process flow of the method goes back to step S102 (illustrated by FIG. 2), using the first speed planning engine 11 to evaluate the reasonable maximum cutting speed again and thereby perform speed planning in steps S102 through S105.

As shown in FIG. 1, FIG. 3 and FIG. 5, in an embodiment, upon completion of the adjustment of each stage time of each cutting route W1 and execution of speed planning in accordance with the digital period adjustment time Ts, the second speed planning engine 13 is further adapted to check and determine whether the terminal cutting speed of the cutting routes W1 is equal to the initial cutting speed of its next cutting route W1. Given a negative determination, the second speed planning 13 engine is adapted to make the terminal cutting speed of the cutting route W1 equal to the initial cutting speed of its next cutting route W1 again, and the speed determination engine 14 performs speed planning on the cutting route W1 again and then checks whether the initial cutting speed of the cutting route W1 is equal to the terminal cutting speed of its preceding cutting route W1. The step S105 in FIG. 5 can be followed by step S104 to perform a check. For instance, the speed curves shown in FIG. 9 and FIG. 10 indicate that the initial cutting speed or terminal cutting speed has been adjusted, and thus speed discontinuity between adjacent cutting routes W1 may have occurred. Therefore, it is necessary to coordinate the initial cutting speed and terminal cutting speed of each cutting route W1 anew to thereby ensure overall cutting speed continuity.

While the present disclosure has been described by means of specific embodiments, numerous modifications and variations could be made thereto by those skilled in the art without departing from the scope and spirit of the present disclosure set forth in the claims.

What is claimed is:

1. A cutting speed planning system, adapted to plan a processing speed of a graphic path having a plurality of cutting routes, wherein the cutting speed planning system comprises:
   a graphic preprocessing engine adapted to compare an actual cutting route corresponding to a plurality of short straight paths with a simplified cutting route defined by a straight line between any two endpoints of the short straight paths, wherein the simplified cutting route substitutes for the actual cutting route within a range defined by the two endpoints when an deviation between the simplified cutting route and the actual cutting route is less than a predetermined deviation threshold;
   a first speed planning engine adapted to calculate a reasonable maximum cutting speed of each said cutting route according to a length of the cutting route and an estimated maximum cutting speed corresponding to the graphic path;
   an included angle calculation engine adapted to calculate an included angle between two adjacent ones of the cutting routes;

a second speed planning engine adapted to make a terminal cutting speed of each said cutting route equal to an initial cutting speed of a next cutting route; and a speed determination engine adapted to change each stage time of each said cutting route into an integer multiple of a digital control system period time and adjust respective speed planning of the cutting routes.

2. The cutting speed planning system of claim 1, wherein the included angle calculation engine is adapted to calculate an included angle between any two adjacent ones of the cutting routes, the cutting routes including straight routes and arcuate routes, wherein the included angle calculation engine is adapted to calculate included angles between the straight cutting routes, included angles between the arcuate cutting routes, and included angles between the straight and arcuate cutting routes.

3. The cutting speed planning system of claim 1, wherein the graphic preprocessing engine creates a linear planning model in a two-dimensional space by method of least square to calculate a total deviation of folding lines defined by a plurality of endpoints within the range defined by a straight line between any two endpoints of the short straight paths, wherein, when the total deviation is less than a maximum value of the predetermined deviation threshold, the simplified cutting route corresponding to the straight line substitutes for the actual cutting route corresponding to the folding lines.

4. The cutting speed planning system of claim 1, wherein, if the length of each said cutting route, as calculated by the first speed planning engine, is sufficient for carrying out a uniform-speed cutting process at the estimated maximum cutting speed, the reasonable maximum cutting speed will be set to the estimated maximum cutting speed, otherwise the estimated maximum cutting speed will be adjusted to the reasonable maximum cutting speed according to the total acceleration stage time, acceleration increment stage time, uniform acceleration stage time, estimated maximum cutting speed, initial cutting speed, maximum acceleration, uniform speed stage time, maximum deceleration, total deceleration stage time, deceleration increment stage time, deceleration decrement stage time and S-shaped speed curve adjustment parameter, which the cutting route corresponds to.

5. The cutting speed planning system of claim 4, wherein the total acceleration stage time is denoted by $T_a$, acceleration increment stage time by $T_1$, uniform acceleration stage time by $T_2$, acceleration decrement stage time by $T_3$, estimated maximum cutting speed by $V_{max}$, initial cutting speed by $V_{start}$, terminal cutting speed by $V_{end}$, maximum acceleration by $Acc_{max}$, uniform speed stage time by $T_4$, length of cutting routes by $L$, maximum deceleration by $Dec_{max}$, total deceleration stage time by $T_d$, deceleration decrement stage time by $T_5$, uniform deceleration stage time by $T_6$, deceleration decrement stage time by $T_7$, S-shaped speed curve adjustment parameter by $S_{factor}$, and reasonable maximum cutting speed by $V'_{max}$, which each said cutting route corresponds to, wherein:

$$T_a = (V_{max} - V_{start})/Acc_{max}, T_1 = T_3 = s_{factor}T_a, T_2 = T_a - T_1$$

$$T_d = (V_{max} - V_{end})/Dcc_{max}, T_5 = T_7 = s_{factor}T_d, T_6 = T_d - T_5$$

$$T_4 = \left[L - T_u\left(V_{start} + \frac{1}{2}Acc_{max}T_a\right) - T_l\left(V_{max} + \frac{1}{2}Dec_{max}T_d\right)\right]/V_{max},$$

$$T_u = 2T_1 + T_2, T_l = 2T_5 + T_6,$$

wherein that $T_4$ is greater than 0 indicates that the length of the cutting route is sufficient and that the reasonable maximum cutting speed $V'_{max}=V_{max}$, wherein, when $T_4$ is less than or equal to 0, the reasonable maximum cutting speed is expressed by the equation below, $$V'_{max} = \sqrt{\left[\frac{V_{end}^2}{Dec_{max}} - \frac{V_{start}^2}{Acc_{max}} - \left(\frac{2L}{1+s_{factor}}\right)\right]/\left(\frac{1}{Dec_{max}} - \frac{1}{Acc_{max}}\right)}.$$

6. The cutting speed planning system of claim 1, wherein the speed determination engine is adapted to adjust an acceleration increment stage time, a uniform acceleration stage time, a uniform speed stage time, a deceleration decrement stage time, and a uniform deceleration stage time for each said cutting route into an integer multiple of the digital control system period time.

7. The cutting speed planning system of claim 1, wherein the second speed planning engine is adapted to calculate a turning angle restriction speed between the cutting routes and set a terminal cutting speed of each said cutting route and an initial cutting speed of its next cutting route to a least one of the turning angle restriction speed, the reasonable maximum cutting speed corresponding to each said cutting route, and the reasonable maximum cutting speed corresponding to a next cutting route.

8. The cutting speed planning system of claim 7, wherein the turning angle restriction speed is denoted by $V_{limit}$, the maximum acceleration corresponding to each said cutting route by $Acc_{max}$, the included angle between each said cutting route and its next cutting route by $\beta$, and the digital control system period time by $T_s$, wherein $V_{limit}=Acc_{max}T_s/2\sin(\beta_i/2)$.

9. The cutting speed planning system of claim 1, wherein, upon completion of the adjustment of each stage time of each said cutting route in accordance with the digital period adjustment time, the second speed planning engine checks and determines whether a terminal cutting speed of the cutting route is equal to an initial cutting speed of its next cutting route, wherein, given a negative determination, the second speed planning engine makes the terminal cutting speed of the cutting route equal to the initial cutting speed of its next cutting route again, and the speed determination engine performs speed planning on the cutting route again and then checks whether the initial cutting speed of the cutting route is equal to the terminal cutting speed of its preceding cutting route.

10. A cutting speed planning method, adapted to plan a processing speed of a graphic path having a plurality of cutting routes, the cutting speed planning method comprising the steps of:

comparing, with a graphic preprocessing engine, an actual cutting route attributed to the cutting routes and corresponding to a plurality of short straight paths with a simplified cutting route connected by a straight line between any two endpoints of the uniform short straight paths, wherein the simplified cutting route substitutes for an actual cutting route within a range defined by the two endpoints when an deviation between the simplified cutting route and the actual cutting route is less than a predetermined deviation threshold;

calculating, with a first speed planning engine, a reasonable maximum cutting speed of each said cutting route according to a length of the cutting routes and an estimated maximum cutting speed corresponding to the graphic path;

calculating, with an included angle calculation engine, an included angle between two adjacent ones of the cutting routes;

making, with a second speed planning engine, a terminal cutting speed of each said cutting route equal to an initial cutting speed of a next cutting route; and changing each stage time of each said cutting route to an integer multiple of a digital control system period time and adjusting respective speed planning of the cutting routes, with a speed determination engine.

11. The cutting speed planning method of claim 10, wherein, upon completion of the adjustment of each stage time of each said cutting route in accordance with the digital period adjustment time, the second speed planning engine further checks and determines whether the terminal cutting speed of the cutting route is equal to the initial cutting speed of its next cutting route, wherein, given a negative determination, the second speed planning engine makes the terminal cutting speed of the cutting route equal to the initial cutting speed of its next cutting route, and the speed determination engine performs speed planning on the cutting route again and then checks whether the initial cutting speed of the cutting route is equal to the terminal cutting speed of its preceding cutting route.

12. A non-transitory storage medium, adapted to store a plurality of program instructions executable when read by an electronic device to carry out the steps below and thus plan the processing speed of a graphic path having a plurality of cutting routes, the steps comprising:

comparing, with a graphic preprocessing engine, an actual cutting route corresponding to a plurality of short straight paths of the cutting routes with a simplified cutting route defined by a straight line between any two endpoints of the short straight paths, wherein the simplified cutting route substitutes for the actual cutting route within a range defined by the two endpoints when the deviation between the simplified cutting route and the actual cutting route is less than a predetermined deviation threshold;

calculating, with a first speed planning engine, a reasonable maximum cutting speed of each said cutting route according to a length of the cutting routes and an estimated maximum cutting speed corresponding to the graphic path;

calculating, with an included angle calculation engine, an included angle between two adjacent ones of the cutting routes;

making, with a second speed planning engine, the terminal cutting speed of each said cutting route equal to the initial cutting speed of a next cutting route; and changing each stage time of each said cutting route to an integer multiple of a digital control system period time and adjusting respective speed planning of the cutting routes, with a speed determination engine.

\* \* \* \* \*